June 23, 1953     T. R. ZUPANCIC     2,643,151
FISHERMAN'S PLIERS
Filed June 27, 1950

INVENTOR.
TONY R. ZUPANCIC,
BY David H. Eckroad,
Attorney.

Patented June 23, 1953

2,643,151

UNITED STATES PATENT OFFICE 2,643,151

FISHERMAN'S PLIERS

Tony R. Zupancic, Cleveland, Ohio

Application June 27, 1950, Serial No. 170,634

2 Claims. (Cl. 294—118)

My invention relates to new and useful improvements in devices for use as pliers.

The primary object and purpose of this invention is to provide a device in the nature of a pliers particularly for use by fishermen for holding a fish while removing fish hooks from such fish.

Another object of the invention is to provide a device of the character described that will be found adapted to other uses in addition to the holding of a fish, without in any way injuring or harming the fish.

A further object of the invention is the provision of a pliers as described that is quite simple and inexpensive in construction.

Other objects and uses of the invention will appear in the description and by a reference to the associated drawing, in which.

Figure 1:
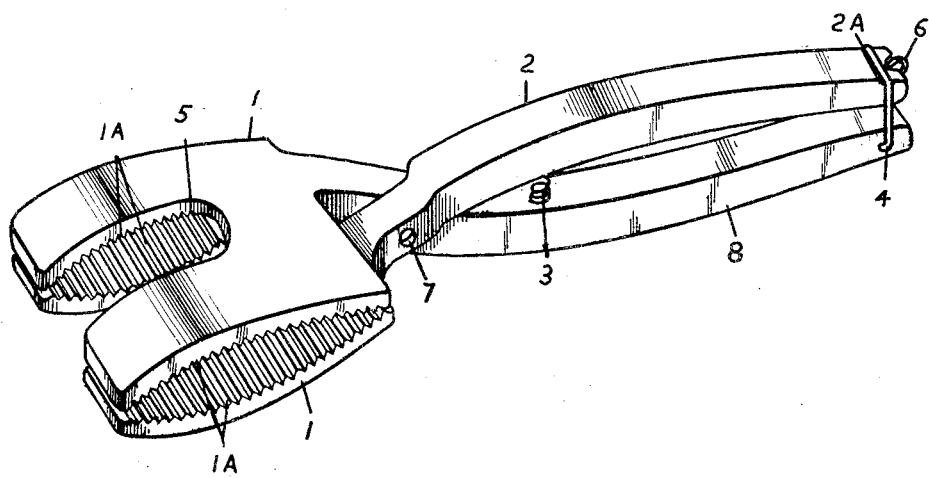
Fig. 1 is a perspective view of the invention, or device.
Figure 2:
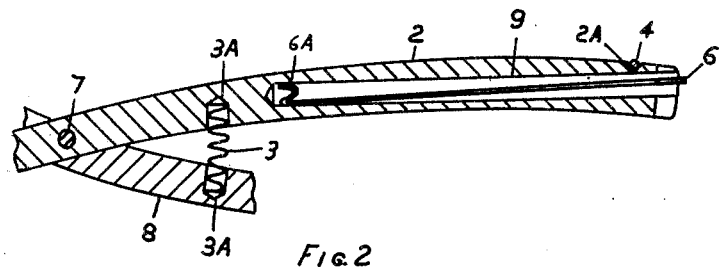
Fig. 2 is a cross-sectional view of segments of the device, showing a channel in one of the handle portions for receiving a tool for removing a hook from the throat of a fish.
Figure 3:
Fig. 3 shows a tool for removing a hook from the throat of a fish, as shown disposed within the channel of the handle in Fig. 2.

Describing the device from the drawings:

The numeral 1 refers to the two complementary head or U shaped jaw portions of the device, such jaws having complementary handle portions 2 and 8, respectively, the concave inner surface of the jaws provided with transverse serrations, or corrugations 1A. 2A is a groove in the end of the handle portion 2 in which a spring wire clamp member 4 is received to hold the pliers in a closed position when desired. 3 is a spiral spring disposed between the two handle portions in the recesses 3A. 5 refers to the U shaped form of the space between the two jaw portions. 6 is a wire tool having its one end portion formed hook-like for removing a hook that is deep in, or stuck in a fish's mouth, or throat. 7 is a means for pivotally connecting the two complementary parts of the device. 9 is a longitudinally formed channel in the one handle portion 2 for receiving a fish hook removing tool 6. Such receiving means may be in the form of an open groove in the upper surface of one of the handle portions in place of within such handle portion as shown:

The device is simple in construction as it consists of a single stamping or casting, two of which are assembled as shown to form the complete device.

As previously stated, the device is designed particularly for use by fishermen for the securely holding of a fish while removing a hook therefrom and in the event such hook is fast deep in the throat, the tool 6 is convenient for engaging such hook to remove same. The inner surface of the jaws being in concave form and having a plurality of serrations or corrugations extending from one side to the other of each of the two portions of the jaws, a fish is readily seized and held in the jaws in a transverse position, or at a right angle to the handle portions of the device, the opposing portions of the jaws being adapted to grasp the tail part of the body of a fish, or other part of the body of a fish, and hold same firmly for the purposes as stated, or for scaling, or otherwise preparing the fish for use.

Another important feature of the device that is readily apparent is that the device is adapted to seize and hold a fish without causing any injury to such fish. Most all other devices for similar use injure, or even kill a fish by reason of the manner in which such devices grasp or hold the fish.

Having thus described my invention, what I claim and desire to secure by Letters-Patent is:

1. A pliers of the class described comprising two complementary wide opposing jaws with integral handle portions, each of said jaws having an arcuate shaped inner surface and the outer surface in convex form, a part of the central portion of the jaws cut out in a U-shaped form extending inwardly from the front edge of the jaws, the arcuate-inner surface of the jaws having a plurality of serrations formed transversely therein, and a space provided between the said inner surfaces of the opposed jaws when such jaws are in a closed position.

2. A pliers as described in claim 1, a spiral spring disposed between the handle portions, and a means secured on the outer end portion of one handle to clamp the handles together and maintain the jaws in their closed position.

TONY R. ZUPANCIC.

References Cited in the file of this patent

UNITED STATES PATENTS

| Number | Name | Date |
|---|---|---|
| 1,093,552 | Ebaugh | Apr. 14, 1914 |
| 1,095,054 | Wiesenfeld | Apr. 28, 1914 |
| 1,781,419 | Wallace | Nov. 11, 1930 |